(12) United States Patent
Ramappan et al.

(10) Patent No.: US 8,433,500 B2
(45) Date of Patent: Apr. 30, 2013

(54) SYSTEM AND METHOD FOR IMPROVED TRANSITIONS BETWEEN ENGINE COMBUSTION MODES

(75) Inventors: Vijay Ramappan, Novi, MI (US); Jun-Mo Kang, Ann Arbor, MI (US); Hanho Yun, Oakland Township, MI (US)

(73) Assignee: GM Global Technology Operations LLC

( * ) Notice: Subject to any disclaimer, the term of this patent is extended or adjusted under 35 U.S.C. 154(b) by 495 days.

(21) Appl. No.: 12/791,367

(22) Filed: Jun. 1, 2010

(65) Prior Publication Data

US 2011/0295487 A1 Dec. 1, 2011

(51) Int. Cl.
| | |
|---|---|
| G06F 19/00 | (2011.01) |
| F02M 25/07 | (2006.01) |
| F02M 51/00 | (2006.01) |
| F02B 17/00 | (2006.01) |
| F02D 41/30 | (2006.01) |

(52) U.S. Cl.
USPC ........... 701/104; 701/103; 701/108; 123/295; 123/299; 123/305; 123/568.21

(58) Field of Classification Search ............ 123/295, 123/299, 300, 305, 430, 431, 478, 480, 568.16, 123/568.21; 701/101–105, 108, 111, 114
See application file for complete search history.

(56) References Cited

U.S. PATENT DOCUMENTS

| | | | |
|---|---|---|---|
| 6,947,830 B1* | 9/2005 | Froloff et al. | 701/111 |
| 7,165,527 B2* | 1/2007 | Okude et al. | 123/299 |
| 7,769,525 B2* | 8/2010 | Kakuya et al. | 701/103 |
| 2009/0250041 A1* | 10/2009 | Minami | 123/568.12 |

FOREIGN PATENT DOCUMENTS

EP 1939422 A1 * 7/2008 ............ 123/295

* cited by examiner

Primary Examiner — Willis R Wolfe, Jr.

(57) ABSTRACT

A control system for a homogeneous charge compression ignition (HCCI) engine includes a timing adjustment module and a combustion control module. The timing adjustment module, per combustion event, advances timings of N fuel injections and retards timings of M fuel injections and spark during a transition from HCCI combustion to mixed-mode combustion. The combustion control module subsequently retards the timings of the N fuel injections and advances the timings of the M fuel injections and the spark to desired timings, respectively, wherein the N fuel injections and the M fuel injections occur sequentially during each combustion event of the HCCI engine, and wherein N and M are integers greater than or equal to zero.

20 Claims, 5 Drawing Sheets

SYSTEM AND METHOD FOR IMPROVED TRANSITIONS BETWEEN ENGINE COMBUSTION MODES

FIELD

The present disclosure relates to homogeneous charge compression ignition (HCCI) engines, and more particularly to a system and method for controlling fuel injection timing and spark timing during transitions between combustion modes of HCCI engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an inlet system that may be regulated by a throttle. The air in the intake manifold may be distributed to a plurality of cylinders and combined with fuel to create an air/fuel (A/F) mixture. The fuel may be provided via a plurality of fuel injectors located at intake ports of the cylinders (i.e., port fuel injection) or in the cylinders (i.e., direct fuel injection). The A/F mixture may be compressed by pistons and combusted within the cylinders to drive the pistons and rotatably turn a crankshaft generating drive torque.

Homogeneous charge compression ignition (HCCI) engines may operate in a plurality of combustion modes depending on operating conditions (e.g., engine load). The plurality of combustion modes may include HCCI combustion, spark ignition (SI) combustion, and mixed-mode combustion (e.g., a combination of HCCI and SI combustion). More specifically, for example, HCCI engines may operate via mixed-mode combustion at low engine loads, HCCI combustion at medium engine loads, and SI combustion at high engine loads.

SI combustion includes compressing the A/F mixture and igniting the compressed A/F mixture via spark from spark plugs. HCCI combustion, on the other hand, includes compressing the A/F mixture until a critical pressure and/or temperature is reached and the A/F mixture automatically combusts. Mixed-mode combustion, as previously stated, includes a combination of HCCI combustion and SI combustion. More specifically, mixed-mode combustion includes HCCI combustion plus "assisting" the combustion of the A/F mixture via spark from spark plugs.

SUMMARY

A control system for a homogeneous charge compression ignition (HCCI) engine includes a timing adjustment module and a combustion control module. The timing adjustment module, per combustion event, advances timings of N fuel injections and retards timings of M fuel injections and spark during a transition from HCCI combustion to mixed-mode combustion. The combustion control module subsequently retards the timings of the N fuel injections and advances the timings of the M fuel injections and the spark to desired timings, respectively, wherein the N fuel injections and the M fuel injections occur sequentially during each combustion event of the HCCI engine, and wherein N and M are integers greater than or equal to zero.

A method for controlling a homogeneous charge compression ignition (HCCI) engine includes, per combustion event, advancing timings of N fuel injections and retarding timings of M fuel injections and spark during a transition from HCCI combustion to mixed-mode combustion, and subsequently retarding the timings of the N fuel injections and advancing the timings of the M fuel injections and the spark to desired timings, respectively, wherein the N fuel injections and the M fuel injections occur sequentially during each combustion event of the HCCI engine, and wherein N and M are integers greater than or equal to zero.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
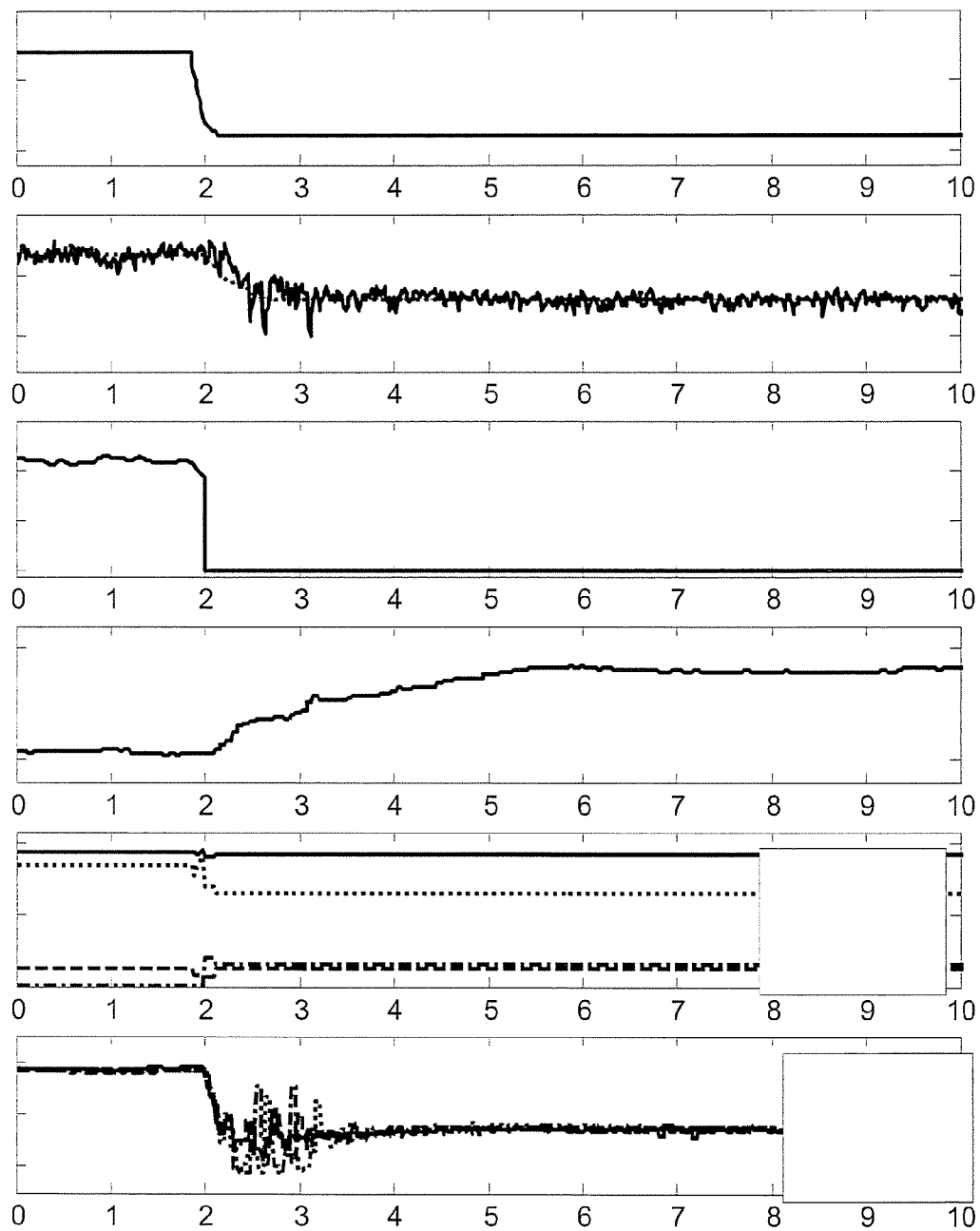
FIG. 1 is graphs illustrating a conventional transition between combustion modes of a homogeneous charge compression ignition (HCCI) engine.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

HCCI engine systems may include exhaust gas recirculation (EGR) systems. EGR systems may introduce exhaust gas produced during combustion into an intake manifold, thereby combining the exhaust gas with fresh air in the intake manifold. For example, EGR may be used to increase efficiency of and/or improve control of HCCI combustion. More specifically, EGR may improve combustion efficiency by decreasing heat transfer loss and may improve control of HCCI combustion by providing for control of a ratio of an air/fuel (A/F) mixture being combusted.

Moreover, EGR may be more useful at higher engine loads. In other words, an amount (e.g., a percentage) of EGR may increase as engine load increases during HCCI combustion. Therefore, a substantial amount of EGR may be required during high load HCCI combustion (i.e., high load relative to an HCCI combustion operating range). Mixed-mode combustion (e.g., low engine loads), however, may not tolerate EGR. In other words, EGR during mixed-mode combustion may cause combustion problems (e.g., misfires, stalling, etc.), particularly during abrupt (i.e., fast) HCCI to mixed-mode transitions. For example, fast HCCI to mixed-mode transitions may occur when a driver of the vehicle removes his foot from an accelerator pedal.

Referring now to FIG. 1, a transition from HCCI combustion to mixed-mode combustion is illustrated. Specifically, six graphs are shown with respect to time (e.g., in seconds, or s) and from top to bottom represent fuel injection quantity (e.g., in milligrams per second, or mg/s), MAF rate (e.g., in grams per second, or g/s), EGR valve position (e.g., opening percentage, or %), negative valve overlap (NVO, e.g., in crank angle degrees, or CAD), fuel injection and spark timings (e.g., in degrees before top-dead-center, or BTDC), and indicated mean effective pressure (IMEP, e.g., barometric pressure, or Bar), respectively.

More specifically, the transition occurs when MAF rate (i.e., engine load) decreases below an HCCI combustion threshold. Therefore, EGR is disabled (e.g., an EGR valve is closed) during the transition to mixed-mode combustion. However, exhaust gas may remain in the intake manifold during and/or after the transition. Rather, a relatively small amount of NVO may occur, which may cause combustion problems when conventional fuel injection timing and spark timing are used. For example, the combustion problems (e.g., misfires, stalling, etc.) are illustrated by fluctuations in the IMEP of the cylinders.

Accordingly, a system and method are presented for controlling fuel injection timing and spark timing during transitions between combustion modes of an HCCI engine. Specifically, the system and method may control fuel injection timing and spark timing to prevent combustion problems during transitions from HCCI combustion to mixed-mode combustion. The system and method may, per combustion event, advance timing of N fuel injections, retard timing of M fuel injections, and retard spark timing. The N and M fuel injections may occur sequentially with the N fuel injections preceding the M fuel injections. For example, N may be two and M may be one (e.g., a total of three fuel injections in each cylinder during each combustion cycle).

More specifically, the system and method may, per combustion event, advance the timing of the N fuel injections, retard the timing of the M fuel injections, and retard the spark timing to predetermined timings, respectively. The system and method may then retard the timing of the N fuel injections, advance the timing of the M fuel injections, and advance the spark timing to desired timings during a predetermined period. Advancing the timing of the N fuel injections may increase fuel reforming during mixed-mode combustion. Additionally, retarding the timing of the M fuel injections and the spark timing may provide for more robust stratified combustion during the transition from HCCI combustion to mixed-mode combustion.

Figure 2:
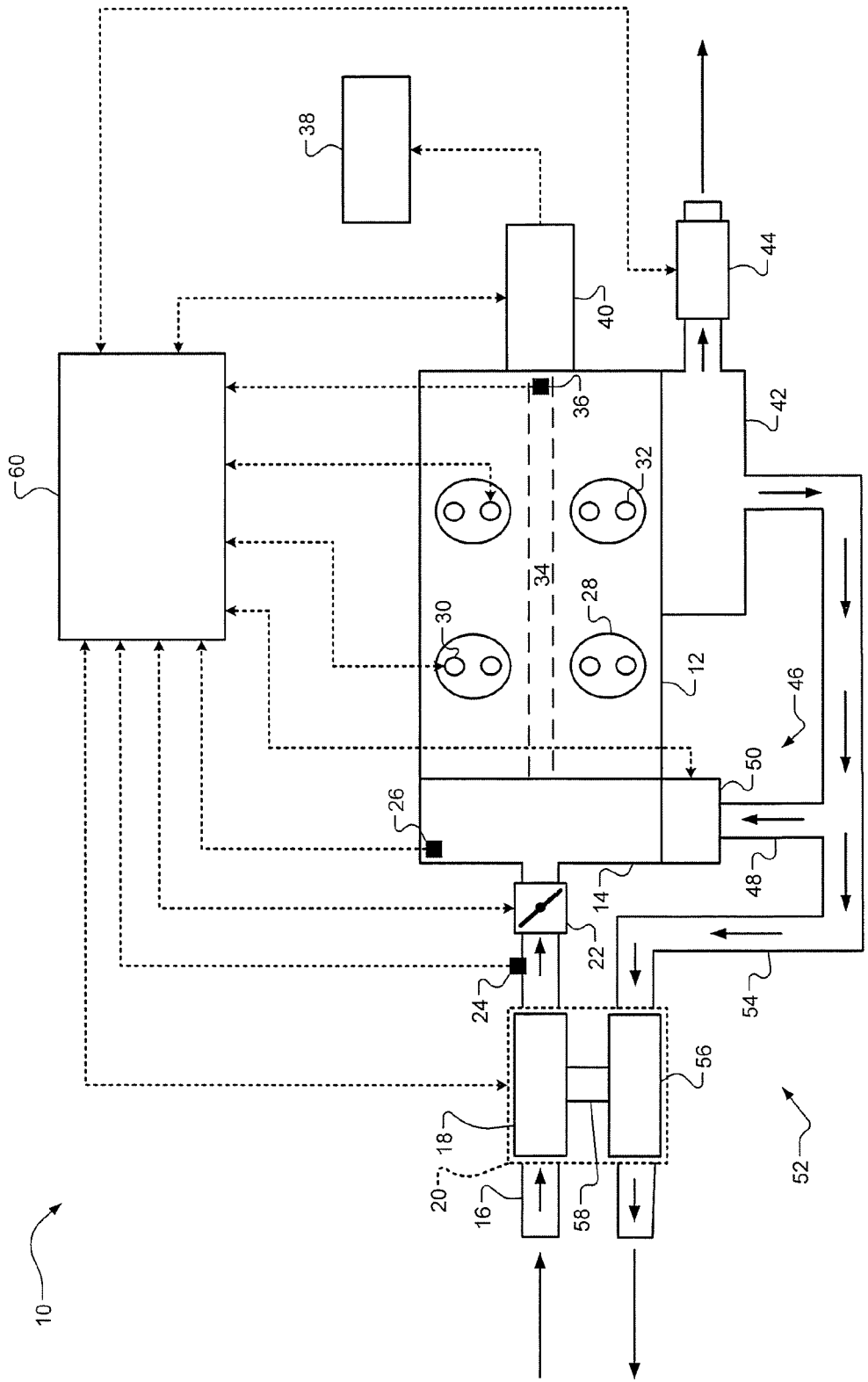
FIG. 2 is a functional block diagram of an exemplary HCCI engine system according to the present disclosure.

Referring now to FIG. 2, an engine system 10 includes an HCCI engine 12. The HCCI engine 12 draws air into an intake manifold 14 through an inlet system 16 that may be regulated by a throttle 22. For example, the throttle 22 may be electronically controlled (e.g., electronic throttle control, or ETC). A compressor 18 of a turbocharger 20 (also referred to as "turbo 20") may pressurize (i.e., boost) the air drawn into the intake manifold 14. A MAF sensor 24 may measure the MAF rate through the inlet system 16. An intake manifold absolute pressure (MAP) sensor 26 measures a pressure of the air inside the intake manifold 14. The air in the intake manifold 14 may be distributed to a plurality of cylinders 28. While four cylinders are shown, the HCCI engine 12 may include other numbers of cylinders.

The air in the cylinders 28 may be mixed with fuel from a plurality of fuel injectors 30 to create an A/F mixture. For example, the fuel injectors 30 may inject the fuel via intake ports of the cylinders 28 (i.e., port fuel injection) or directly into the cylinders 28 (i.e., direct fuel injection). The A/F mixture may be compressed by pistons (not shown) within the cylinders 28. During HCCI combustion, the A/F mixture may be compressed until the A/F mixture reaches the critical pressure and/or temperature and automatically combusts. The HCCI engine 12, however, may also include a plurality of spark plugs 32 used for "spark assist" (e.g., during mixed-mode combustion) and/or spark ignition during SI combustion.

The combustion of the A/F mixture within the cylinders 28 drives pistons (not shown) which rotatably turn a crankshaft 34 generating drive torque. An engine speed sensor 36 may measure a rotational speed of the crankshaft 34 (e.g., in revolutions per minute, or RPM). The drive torque may be transferred from the crankshaft 34 to a driveline 38 (e.g., wheels) of the vehicle via a transmission 40. The transmission 40 may also be coupled to the crankshaft 34 via a fluid coupling such as a torque converter (not shown). Exhaust gas resulting from combustion may be expelled from the cylinders 28 into an exhaust manifold 42.

An exhaust treatment system (ETS) 44 may treat the exhaust gas to reduce emissions before releasing the exhaust gas into the atmosphere. For example, the ETS 44 may include at least one of oxidation catalysts (OCs), NOx absorbers/adsorbers, selective catalytic reduction (SCR) catalysts, particulate matter (PM) filters, and catalytic converters. The exhaust gas may also be recirculated into the intake manifold 14 via an EGR system 46 that includes an EGR line 48 and an EGR valve 50. In other words, the EGR line 48 may connect the exhaust manifold 42 to the intake manifold 14 and the EGR valve 50 may regulate an amount of exhaust gas introduced into the intake manifold 14.

Furthermore, the exhaust gas may be routed through a turbine system 52 that includes a turbine line 54 and a turbine 56 (part of the turbocharger 20). The exhaust gas may rotate the turbine 56 before being released into the atmosphere. The exhaust gas, however, may also be treated to decrease emissions (similar to the ETS 44) before being released into the atmosphere. The turbine 56 powers the compressor 18 via a shaft 58 of the turbocharger 20. Moreover, while the EGR system 46 and the turbine system 52 are shown to share a port of the exhaust manifold 42, the EGR system 46 and the turbine system 52 may have separate ports (and thus a separate EGR line 48 and turbine line 54).

A control module 60 may receive signals from the turbocharger 20, the throttle 22, the MAF sensor 24, the MAP sensor 26, the fuel injectors 30, the spark plugs 32, the engine speed sensor 36, the transmission 40, the ETS 44, and/or the EGR valve 50. Furthermore, the control module 60 may control the turbocharger 20 (e.g., boost pressure), the throttle 22 (e.g., ETC), the fuel injectors 30, the spark plugs 32, the transmission 40, the ETS 44, and/or the EGR valve 50. The control module 60 may also implement the system or method of the present disclosure.

Figure 3:
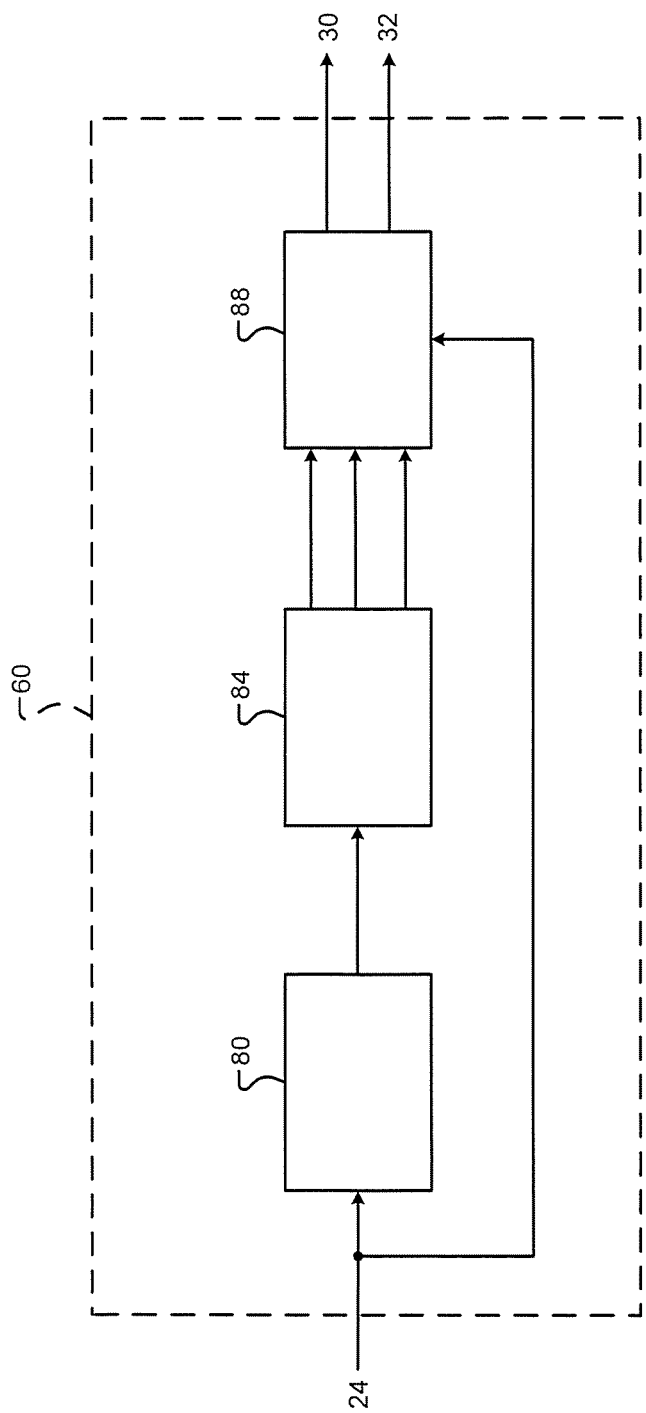
FIG. 3 is a functional block diagram of an exemplary control module according to the present disclosure.

Referring now to FIG. 3, the control module 60 is shown in more detail. The control module 60 may include a transition detection module 80, a timing adjustment module 84, and a combustion control module 88. The control module 60 may also include memory (not shown) for storing predetermined and determined parameters. For example, the memory (not shown) may include non-volatile memory (NVM).

The transition detection module 80 detects transitions from HCCI combustion to mixed-mode combustion. More specifically, the transition detection module 80 may determine when a load on the HCCI engine 12 decreases below an HCCI operating threshold. In other words, the transition detection module 80 may detect when the engine load decreases from an HCCI operating range to a mixed-mode operating range. For example, the HCCI operating threshold may include a smallest engine load that the HCCI engine 12 may operate via HCCI combustion. The transition detection module 80 receives a signal from the MAF sensor 24 indicating a load on the HCCI engine 12. The transition detection module 80, however, may also receive signals indicating other parameters, such as input from the driver of the vehicle.

The timing adjustment module 84 communicates with the transition detection module 80. For example, the transition detection module 80 generate a status signal to notify the timing adjustment module 84 that the HCCI engine 12 is transitioning from (or is about to transition from) HCCI combustion to mixed-mode combustion. Thus, the timing adjustment module 84 may then adjust fuel injection timing and spark timing when the status signal is received from the transition detection module 80. For example, the timing adjustment module 84 may adjust the timings of N and M fuel injections and spark timing. In other words, each combustion cycle may include (N+M) sequential fuel injections followed by spark. For example, N may be an integer greater than or equal to two and M may be an integer greater than or equal to one. For example only, N may be two and M may be one.

More specifically, the timing adjustment module 84 may advance the timing of the N fuel injections and retard the timing of the M fuel injections and the spark timing. In other words, the timing adjustment module 84 may advance the timing of the N fuel injections, retard the timing of the M fuel injections, and retard the spark timing to predetermined timings. For example, the timing adjustment module 84 may advance the timing of the N fuel injections to predetermined timings $t_{N1}+t_{NN}$, and may retard the timing of the M fuel injections and the spark timing to predetermined timings $t_{M1}-t_{MM}$ and $t_S$, respectively.

The combustion control module 88 receives the adjusted timings of the N fuel injections ($t_{N1}+t_{NN}$, respectively, also referred to as "N"), the M fuel injections ($t_{M1}-t_{MM}$, respectively, also referred to as "M"), and the spark ($t_S$, also referred to as "S"). For example, the timings and the adjusted timings may include degrees (°) of the crankshaft 34 (also known as crank angle degrees, or CAD) before compression top-dead-center (BTDC). The combustion control module 88 may also receive the signal from the MAF sensor 24 indicating the load on the HCCI engine 12. Furthermore, the combustion control module 88 may also receive other signals indicating other engine operating parameters (e.g., driver input, engine speed, etc.).

More specifically, the combustion control module 88 may determine desired timings based on the engine load and/or the other engine operating parameters. In other words, the combustion control module 88 may determine the desired timings for mixed-mode combustion. For example, the desired timings may include desired timings for each of the N and M fuel injections (e.g., $t_{DN1}+t_{DNN}$, respectively, and $t_{DM1}-t_{DMM}$, respectively) and a desired timing for the spark (e.g., $t_{DS}$). The combustion control module 88 may initially control fuel injection and spark based on the adjusted timings N, M, and S. The combustion control module 88, however, may then retard the timing of the N fuel injections and advance the timing of the M fuel injections and the spark timing until the desired timings are reached.

Specifically, the combustion control module 88 may adjust the timings to the desired timings during a period. For example, the period may be a predetermined period. The period, however, may be based on other parameters (e.g., a duration of the transition between HCCI combustion and mixed-mode combustion). After the combustion control module 88 has retarded the timing of the N fuel injections and advanced the timing M fuel injections and the spark timing to the desired timings, respectively, control may continue during mixed-mode combustion according on the desired injection timing.

Figure 4:
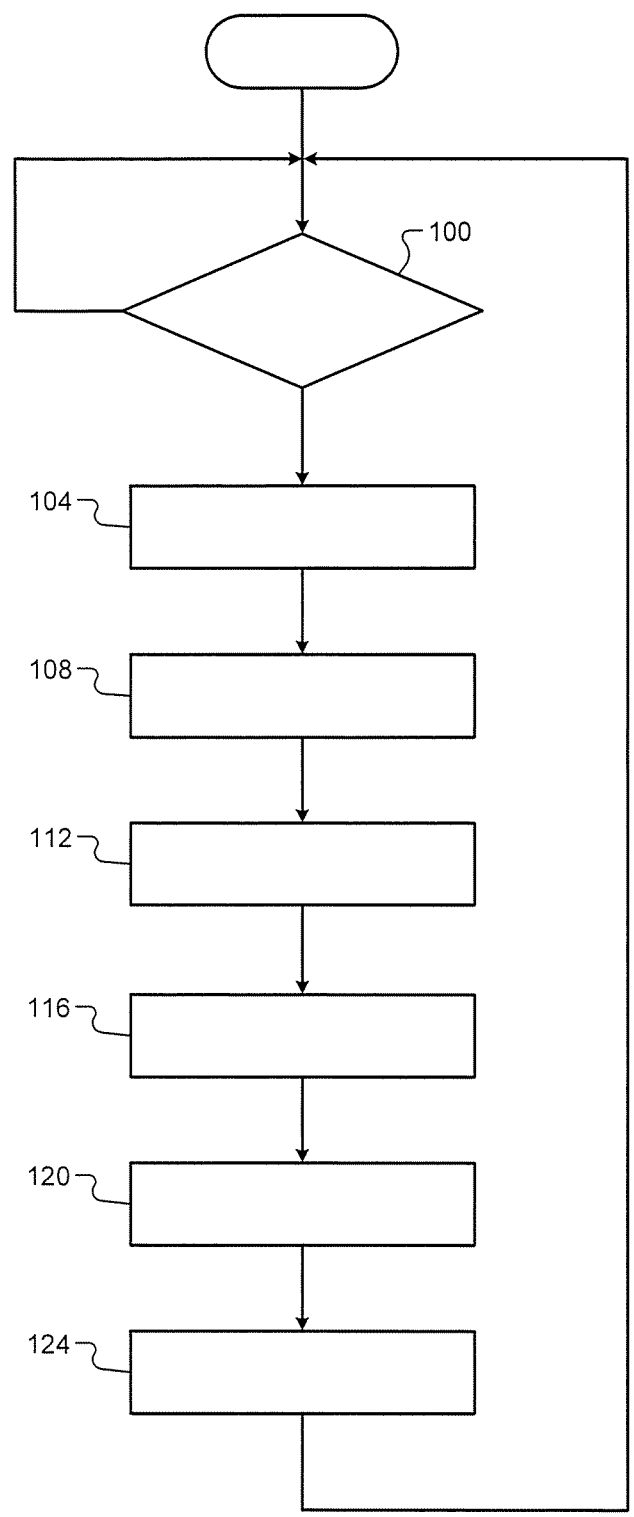
FIG. 4 is a flow diagram of an exemplary method for controlling fuel injection timing and spark timing during transitions between combustion modes of an HCCI engine according to the present disclosure.

Referring now to FIG. 4, a method for controlling fuel injection timing and spark timing during transitions between combustion modes of the HCCI engine 12 begins at 100. At 100, the control module 60 may detect whether transition from HCCI combustion to mixed-mode combustion is occurring or is imminent (e.g., within a predetermined period from occurring). If true, control may proceed to 104. If false, control may return to 100.

At 104, the control module 60 may advance the timings of the N fuel injections. For example, the control module 60 may advance the timings of the N fuel injections to predetermined timings (e.g., $t_{N1}+t_{NN}$, respectively). At 108, the control module 60 may retard the timings of the M fuel injections. For example, the control module 60 may retard the timings of the M fuel injections to predetermined timings (e.g., $t_{M1}-t_{MM}$, respectively). At 112, the control module 60 may retard the spark timing to a predetermined timing (e.g., $t_S$). Additionally, for example, the predetermined timings may also be based on other parameters (e.g., a speed of the transition from HCCI combustion to mixed-mode combustion).

After the expiration of the predetermined period, at 116 the control module 60 may then retard the timings of the N fuel injections to desired timings, respectively (e.g., $t_{DN1}+t_{DNN}$, respectively). Also, at 120 the control module 60 may then advance the timings the M fuel injections to desired timings, respectively (e.g., $t_{DM1}-t_{DMM}$, respectively). Also, at 124 the control module 60 may then advance the spark timing to a desired timing (e.g., $t_{DS}$). For example, the desired timings (e.g., $t_{DN1}+t_{DNN}$, $t_{DM1}-t_{DMM}$, and $t_{DS}$) may be based on engine load and other inputs (e.g., driver input, engine speed, etc.). Control may then return to 100.

Figure 5:
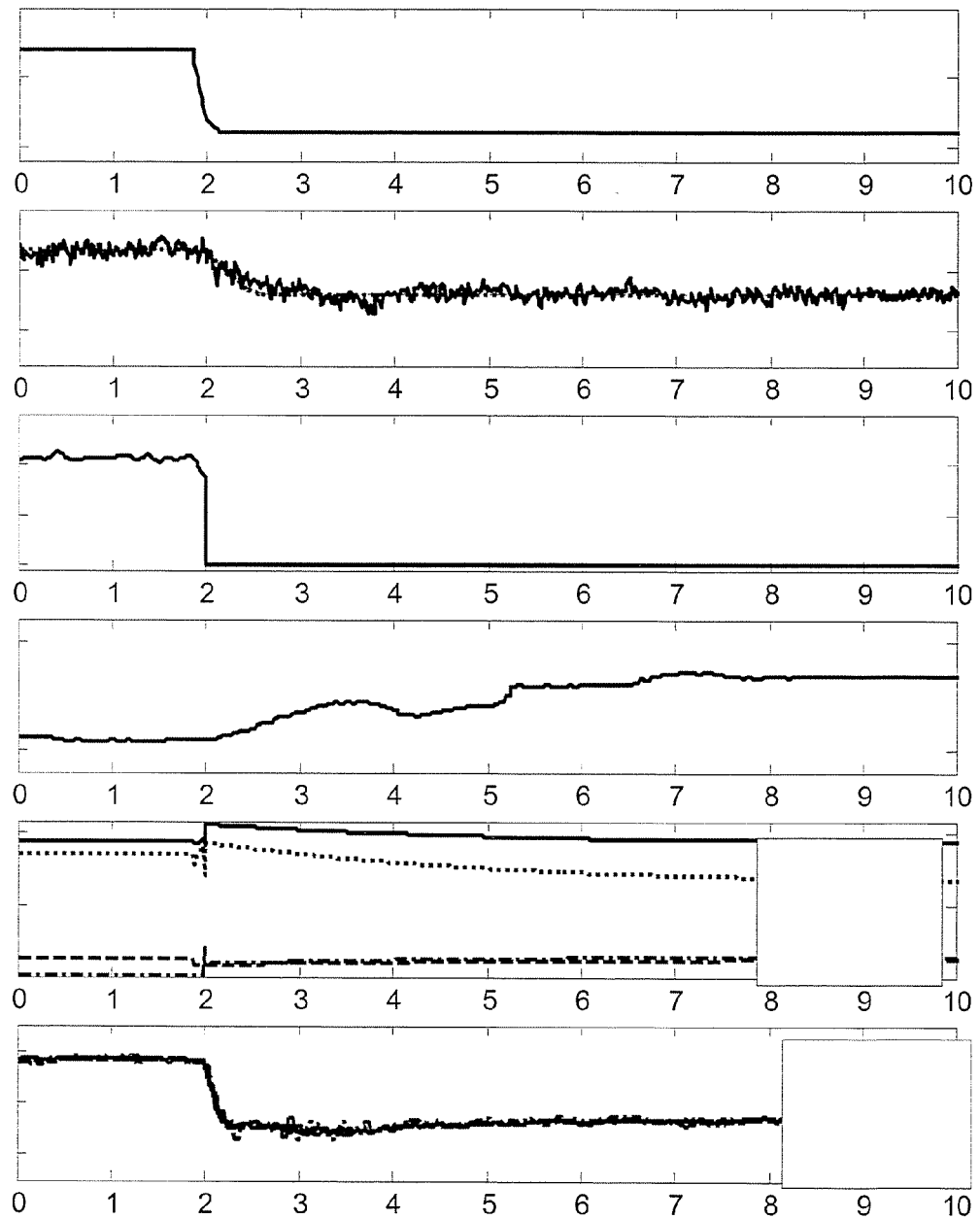
FIG. 5 is graphs illustrating exemplary results of controlling fuel injection timing and spark timing during a transition between combustion modes of an HCCI engine according to the present disclosure.

Referring now to FIG. 5, exemplary results of the system and/or method of the present disclosure are illustrated. Specifically, six graphs are shown with respect to time (e.g., s) and from top to bottom represent fuel injection quantity (e.g., in mg/s), MAF rate (e.g., g/s), EGR valve position (e.g., opening percentage, or %), NVO (e.g., in CAD), fuel injection and spark timings (e.g., in degrees BTDC), and IMEP (e.g., barometric pressure, or Bar), respectively.

More specifically and similar to FIG. 1, a transition from HCCI combustion to mixed-mode combustion occurs when the MAF rate (i.e., engine load) decreases below the HCCI combustion threshold. Accordingly, EGR is disabled (e.g., an EGR valve is closed) during the transition. However, advancing the timings of the N fuel injections and retarding the timings of the M fuel injections and the spark may decrease the amount of NVO (i.e., compared to the conventional control of FIG. 1). Therefore, no combustion problems (e.g., misfires, stalling, etc.) may occur, as shown by the stable IMEP of the cylinders.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a homogeneous charge compression ignition (HCCI) engine, comprising:
   a timing adjustment module that, per combustion event, advances timings of N fuel injections and retards timings of M fuel injections and spark during a transition from HCCI combustion to mixed-mode combustion; and
   a combustion control module that subsequently retards the timings of the N fuel injections and advances the timings of the M fuel injections and the spark to desired timings, respectively,
   wherein the N fuel injections and the M fuel injections occur sequentially during each combustion event of the HCCI engine, and wherein N and M are integers greater than or equal to zero.

2. The control system of claim 1, wherein N is an integer greater than or equal to two and M is an integer greater than or equal to one.

3. The control system of claim 1, wherein the timing adjustment module advances the timings of the N fuel injections and retards the timings of the M fuel injections and the spark to predetermined timings, respectively.

4. The control system of claim 1, wherein the transition from HCCI combustion to mixed-mode combustion includes at least one of closing an exhaust gas recirculation (EGR) valve and disabling an EGR system.

5. The control system of claim 1, wherein mixed-mode combustion includes HCCI combustion and combustion assistance via spark from spark plugs.

6. The control system of claim 1, wherein the combustion control module retards the timings of the N fuel injections and advances the timings of the M fuel injections and the spark to the desired timings, respectively, during a period after the timing adjustment module advances the timings of the N fuel injections and retards the timings of the M fuel injections and the spark.

7. The control system of claim 6, wherein the period includes one of a predetermined period and a time period based on a speed of the transition from HCCI combustion to mixed-mode combustion.

8. The control system of claim 1, wherein the transition from HCCI combustion to mixed-mode combustion occurs when engine load decreases below an HCCI combustion threshold.

9. The control system of claim 8, wherein the engine load is based on at least one of a mass air flow (MAF) rate into the HCCI engine and input from a driver of a vehicle powered by the HCCI engine.

10. The control system of claim 9, wherein the desired timings are based on the engine load.

11. A method for controlling a homogeneous charge compression ignition (HCCI) engine, comprising:
    per combustion event, advancing timings of N fuel injections and retarding timings of M fuel injections and spark during a transition from HCCI combustion to mixed-mode combustion; and
    subsequently retarding the timings of the N fuel injections and advancing the timings of the M fuel injections and the spark to desired timings, respectively,
    wherein the N fuel injections and the M fuel injections occur sequentially during each combustion event of the HCCI engine, and wherein N and M are integers greater than or equal to zero.

12. The method of claim 11, wherein N is an integer greater than or equal to two and M is an integer greater than or equal to one.

13. The method of claim 11, wherein the timings of the N fuel injections are advanced to and the timings of the M fuel injections and the spark are retarded to predetermined timings, respectively.

14. The method of claim 11, wherein the transition from HCCI combustion to mixed-mode combustion includes at least one of closing an exhaust gas recirculation (EGR) valve and disabling an EGR system.

15. The method of claim 11, wherein mixed-mode combustion includes HCCI combustion and combustion assistance via spark from spark plugs.

16. The method of claim 11, wherein the timings of the N fuel injections are retarded to and the timings of the M fuel injections and the spark are advanced to the desired timings, respectively, during a period after advancing the timings of the N fuel injections and retarding the timings of the M fuel injections and the spark.

17. The method of claim 16, wherein the period includes one of a predetermined period and a time period based on a speed of the transition from HCCI combustion to mixed-mode combustion.

18. The method of claim 11, wherein the transition from HCCI combustion to mixed-mode combustion occurs when engine load decreases below an HCCI combustion threshold.

19. The method of claim 18, wherein the engine load is based on at least one of a mass air flow (MAF) rate into the HCCI engine and input from a driver of a vehicle powered by the HCCI engine.

20. The method of claim 19, wherein the desired timings are based on the engine load.

* * * * *